UNITED STATES PATENT OFFICE.

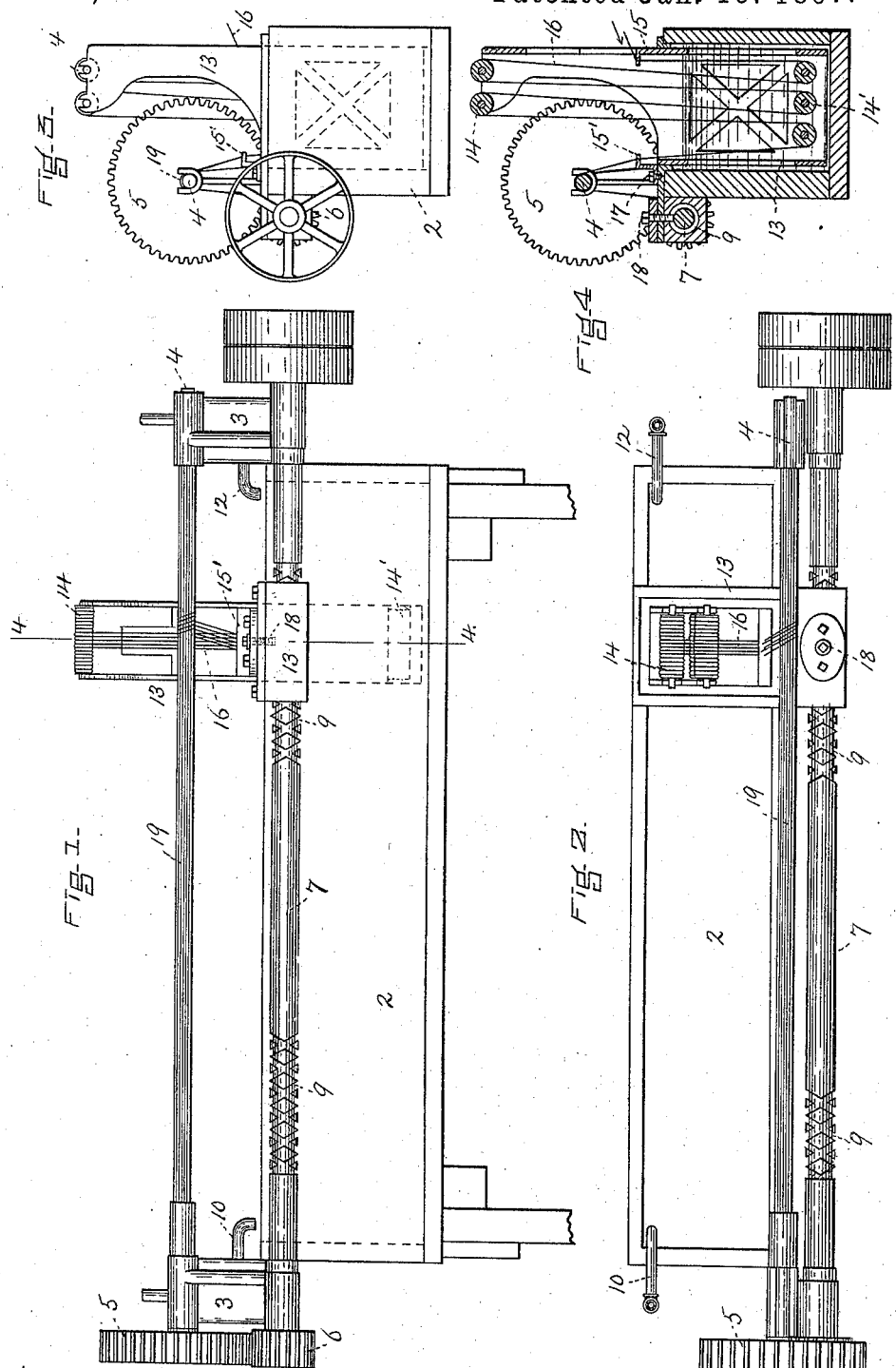

FREDERICK W. HUESTIS, OF BOSTON, MASSACHUSETTS.

APPARATUS FOR WINDING TIRES.

SPECIFICATION forming part of Letters Patent No. 575,398, dated January 19, 1897.

Application filed May 4, 1896. Serial No. 590,136. (No model.)

*To all whom it may concern:*

Be it known that I, FREDERICK W. HUESTIS, a citizen of the United States, residing at Boston, in the county of Suffolk and State of Massachusetts, have invented certain new and useful Improvements in Apparatus for Winding Tires; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to apparatus employed in the manufacture of rubber hose or of tires for vehicles, particularly those styled "pneumatic" and designed for use on bicycles.

In this particular class of tires it is requisite that the tube, which is made of rubber or some rubber compound, should have some strengthening material in the shape of some tough flexible fiber by which the tire when inflated is prevented from unduly expanding, and, furthermore, in this class of tire it is desirable to rubber-coat the threads in order to prevent said threads from chafing or rubbing, these results being due to the resilient action of the tire when in use.

My invention is embodied in apparatus by which the threads are coated with rubber and subsequently wound or wrapped about a revoluble mandrel, and, furthermore, in the use of a traveling carriage, which reciprocates over a tank containing a rubber-bath. This carriage is, moreover, provided with two sets of thread-conveying rolls, and the lower set of rolls, being mounted upon the carriage in such position as to be immersed in the bath, serve as agitators as they pass through the bath.

Other features and peculiar characteristics will be hereinafter fully set forth.

The drawings herewith presented represent, in Figure 1, a side elevation of an apparatus for winding rubber tires and embodying my invention. Fig. 2 is a plan of the same. Fig. 3 is an end elevation, and Fig. 4 is a sectional elevation on line 4 4 in Fig. 1.

In said drawings, 2 represents a liquid-tight reservoir or tank, preferably an oblong rectangular vat, suitably mounted and provided with twin standards 3 3 at each end. In said standards are journaled a removable mandrel 4, one journal being open or without a cap, (see Figs. 3 and 4,) while the opposite end engages a short shaft equipped with a toothed gear 5, which meshes with a pinion 6, affixed to a driving-shaft 7 in parallelism with the mandrel and operated by a pulley 8, connected with some prime motor. Said shaft 7 is peripherally provided its entire length with right and left spiral grooves 9. As before premised, in the winding of the threads during the process of forming a tire it is requisite that the threads should be rubber-coated. In order to accomplish this, the tank or vat 2 is to contain a rubber-bath, the consistency of which is regulated by two valve-controlled pipes 10 12, respectively, for a rubber solution or compound and naphtha or analogous cutting fluid. Furthermore, transversely mounted and sliding upon the vat is a carriage 13, which is equipped with two sets of thread-conveying rolls 14 14', respectively upper and lower. The lower ones are secured in that portion of the carriage which extends almost to the bottom of the vat and are consequently immersed in the bath. Said carriage is apertured at divers places (see Fig. 4) in order to facilitate its passage through the bath. In connection with this carriage are two metallic plates or combs 15 15', perforated to admit the several threads 16, which are in process of winding. Said threads are supplied from bobbins (not shown) and first enter the receiving-comb 15, thence pass about the first of the lower conveying-rolls 14'. From here the thread is passed about one of the upper rolls 14 and finally enters the delivery-comb 15', whence it passes to the mandrel, which is constantly in rotation.

In some instances in lieu of having the comb 15' fixed it may be mounted upon a single swivel or pivot 17, and thus said comb may adjust itself and swing according to the pull of the threads as they pass about the mandrel, and thus enable said threads to travel through the comb with less friction.

In order to cause the carriage to reciprocate longitudinally and endwise of the mandrel, said carriage is extended over the actuating-shaft and is provided with a stout stud or tongue-bolt 18, which projects downwardly and is adapted to engage the spiral grooves cut in said shaft.

The operation of the above-described mechanism is as follows, it being understood that the mandrel is previously fitted with a soft-rubber tube 19, which is drawn smoothly over it and is then placed in its journals for rotation. The thread or threads 16, as one or several may be employed simultaneously in the winding, are entered through the receiving-comb, passed about the several conveying-rolls, and thence enter the delivery-comb, whence they pass about the tube on the mandrel. Said threads in their passage about the conveying-rolls are compelled to enter the rubber-bath and are thus rubber-coated prior to their winding about the mandrel. As the carriage reciprocates in order to lay the threads the entire length of the mandrel, the vat is made somewhat longer than the mandrel, while the lower part of the carriage and rolls mounted at that point during each reciprocation pass through the bath and thus act as agitators. After proper windings, one, two, or more layers of thread being wrapped about the mandrel, the latter is removed. Subsequently a second tube or cover (not shown) is drawn over the threads, and the several parts are then heated and vulcanized.

It is evident, as before premised, that this apparatus is equally well adapted for the manufacture of rubber hose, but whether used for the production of tubes for tires or for hose it is necessary that in the winding the threads should be laid obliquely to the longitudinal axis of the mandrel. Preferably this angle is forty-five degrees; but it may be varied as occasion may require, and in my device this result is accomplished by the proportional difference in the rate of speed between the mandrel and the spirally-grooved shaft. In the present instance this is four to one and is accomplished by the gears 5 6, which may be changed to produce any proportional rates of speed necessary. To maintain each and several of the threads in its respective path until assembled in contiguity about the mandrel, the periphery of said rolls is transversely grooved or corrugated, as shown.

What I claim is—

1. In apparatus for winding tubes, the combination with a revoluble mandrel and a vat to contain a rubber-bath, of a traveling carriage, a plurality of thread-conveying rolls mounted upon the carriage, and means to cause reciprocations of said carriage, substantially as specified.

2. In apparatus for the manufacture of tires, a revoluble mandrel, and a vat to contain a rubber-bath, combined with a carriage mounted upon and traveling lengthwise of the vat, two sets of thread-conveying rolls affixed to said carriage, one set being immersed in the bath, and mechanism to cause reciprocations of the carriage through the bath, substantially as stated.

3. In apparatus for the manufacture of tires, a vat to contain a rubber-bath, a carriage mounted upon and adapted to reciprocate lengthwise of said vat, two sets of thread-conveying rolls, a receiving-comb, a delivery-comb, and a revoluble mandrel about which the threads are wrapped, substantially as explained.

4. In combination with a vat adapted to contain a rubber-bath, means to regulate the consistency of said bath, and a revoluble mandrel lengthwise of said bath, a reciprocating carriage adapted to travel in part through the bath, a plurality of thread-conveying rolls mounted on the carriage, a spirally-grooved rotating shaft to actuate said carriage, and interconnecting mechanism from the carriage to the shaft, substantially as set forth.

5. In apparatus for the manufacture of tires the combination with a mandrel, a vat for a rubber-bath, a carriage traveling on the vat, and two sets of thread-conveying rolls mounted on the carriage, of a receiving-comb, a swiveled delivery-comb, both affixed upon the carriage, a spirally-grooved carriage-actuating shaft, and mechanism to rotate the shaft and likewise the mandrel, substantially as described.

6. In apparatus for winding rubber tubes, a revoluble mandrel, a vat to contain a rubber-bath, a carriage mounted upon and reciprocating within the vat, a plurality of thread-conveying rolls attached to said carriage, combined with a receiving-comb, a delivery-comb, a spirally-grooved shaft, and mechanism to cause the shaft and mandrel to revolve at different rates of speed whereby the threads are laid obliquely about the mandrel, as set forth and specified.

In testimony whereof I affix my signature in presence of two witnesses.

FREDERICK W. HUESTIS.

Witnesses:
H. E. LODGE,
FRANCIS C. STANWOOD.